United States Patent
Sánchez et al.

[11] Patent Number: 5,993,495
[45] Date of Patent: *Nov. 30, 1999

[54] WATER IN VISCOUS HYDROCARBON EMULSION COMBUSTIBLE FUEL FOR DIESEL ENGINES AND PROCESS FOR MAKING SAME

[75] Inventors: Gerardo A. Sánchez, Los Teques; Luis R. Marcano; Gustavo A. Núñez, both of Caracas; Raul Saud, Los Teques, all of Venezuela

[73] Assignee: Intevep, S. A., Caracas, Venezuela

[*] Notice: This patent is subject to a terminal disclaimer.

[21] Appl. No.: 09/027,695

[22] Filed: Feb. 23, 1998

Related U.S. Application Data

[63] Continuation-in-part of application No. 08/599,305, Feb. 9, 1996, Pat. No. 5,725,609.

[51] Int. Cl.$^6$ .................................................. C10L 1/32
[52] U.S. Cl. ........................... 44/301; 123/25 A; 431/4
[58] Field of Search ............................... 44/301; 516/27; 123/25 A; 431/4

[56] References Cited

U.S. PATENT DOCUMENTS

| | | | |
|---|---|---|---|
| 4,315,755 | 2/1982 | Hellsten et al. | 44/302 |
| 5,792,223 | 8/1998 | Rivas | 44/302 |

*Primary Examiner*—Jacqueline V. Howard
*Assistant Examiner*—Cephia D. Toomer
*Attorney, Agent, or Firm*—Bachman & LaPointe, P.C.

[57] ABSTRACT

A combustible fuel for diesel engines and a process for forming same in the form of a water in hydrocarbon emulsion wherein the mean water drop diameter is $\leq 4$ μm with a maximum diameter of $\leq 10$ μm.

13 Claims, 1 Drawing Sheet

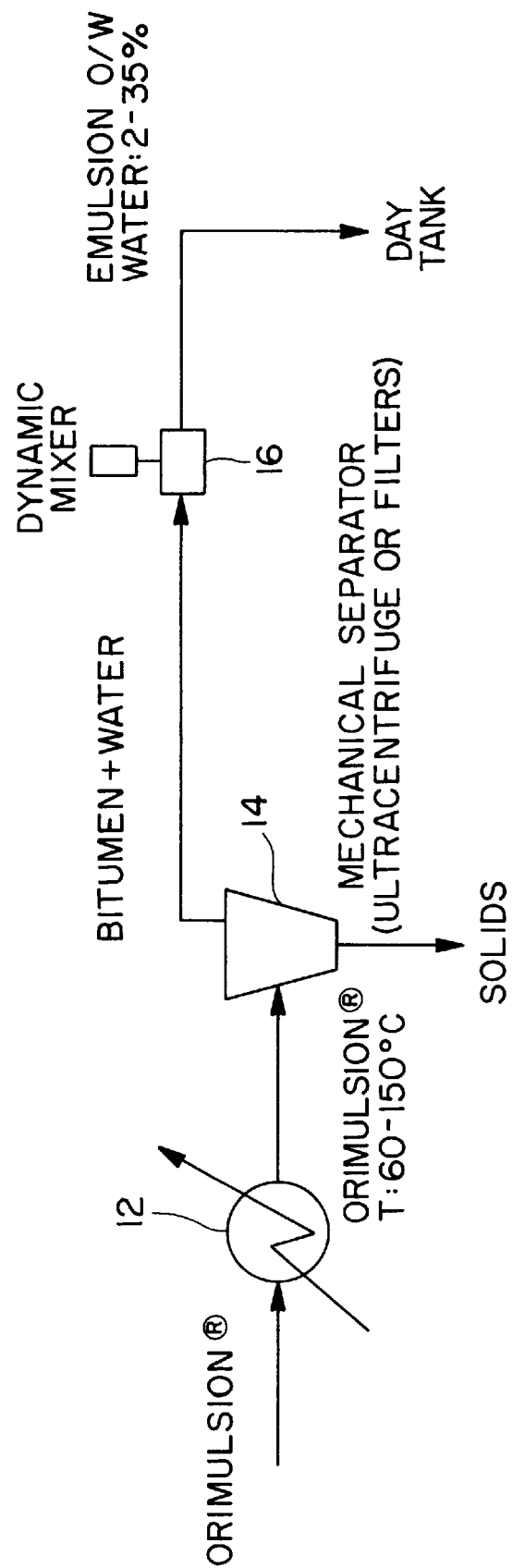

WATER IN VISCOUS HYDROCARBON EMULSION COMBUSTIBLE FUEL FOR DIESEL ENGINES AND PROCESS FOR MAKING SAME

CROSS-REFERENCE TO RELATED APPLICATION

The instant application is a Continuation-In-Part of U.S. patent application Ser. No. 08/599,305 filed Feb. 9, 1996, now U.S. Pat. No. 5,725,609.

BACKGROUND OF THE INVENTION

The present invention relates to a process for utilizing a viscous hydrocarbon as a combustible fuel for diesel engines as well as a combustible fuel product.

It is well known in the art to form hydrocarbon in water emulsions either from naturally occurring bitumens or residual oils in order to facilitate the production and/or transportation of these viscous hydrocarbons. Typical processes are disclosed in U.S. Pat. Nos. 3,380,531; 3,467,195; 3,519,006; 3,943,954; 4,099,537; 4,108,193; 4,239,052; and 4,570,656. In addition to the foregoing, the prior art teaches that hydrocarbon in water emulsions formed from naturally occurring bitumens and/or residual oils can be used as combustible fuels. See for example U.S. Pat. Nos. 4,144,015; 4,378,230; 4,618,348; and British Patent Specification 974,042.

The hydrocarbon in water emulsions discussed above, while useful as combustible fuels in some power plants, are not suitable for burning in diesel engines, particularly low speed diesel engines. Naturally, it would be highly desirable to be able to use viscous naturally occurring bitumens and/or residual oils as a combustible fuel for diesel engines.

Accordingly, it is the principal object of the present invention to provide a process for utilizing a viscous hydrocarbon as a combustible fuel for diesel engines.

It is a particular object of the present invention to provide a process as aforesaid wherein the viscous hydrocarbon is in the form of a naturally occurring bitumen or residual oil.

It is a further object of the present invention to provide a combustible fuel for diesel engines in the form of a water in hydrocarbon emulsion.

Further objects and advantages of the present invention will appear hereinbelow.

SUMMARY OF THE INVENTION

The present invention relates to a process for utilizing a viscous hydrocarbon as a combustible fuel for diesel engines as well as a combustible fuel product.

In accordance with the process of the present invention the viscous hydrocarbon is formed as a hydrocarbon in water emulsion in order to facilitate the production and transportation of the viscous hydrocarbon to the burning site. The hydrocarbon in water emulsion may be prepared by any known process as described in the patents discussed above or as disclosed in U.S. Pat. Nos. 4,801,304; 4,795,478; 4,834,775; 4,923,483; 4,824,439; 4,994,090; 4,776,977; 4,781,819; 4,806,231; and 4,915,819. Additional known processes for forming hydrocarbon in water emulsions are disclosed in U.S. Pat. Nos. 4,934,398; 4,618,348; 4,666,457; 4,684,372; and 4,793,826.

In accordance with the process of the present invention, the hydrocarbon in water emulsion is formed having a hydrocarbon in water ratio of from about 60:40 to about 98:2, preferably, 65:35 to 95:5. The hydrocarbon in water emulsion is formed by employing a surfactant additive which comprises an amine and an ethoxylated alcohol. The amine is present in an amount of at least about 300 parts per million (ppm) (wt) and the ethoxylated alcohol is present in an amount of at least 800 ppm (wt) with respect to the hydrocarbon phase. The surfactant is required to have an ethylene oxide content of greater than or equal to 10, preferably between 10 to 25, and ideally about 15. The viscous hydrocarbons usable in the process of the present invention are those hydrocarbons characterized by an API gravity of less than or equal to 16° API and a viscosity of greater than or equal to 100 cPs at 122° F.

The hydrocarbon in water emulsion described above is subjected to inversion by heating the hydrocarbon in water emulsion to an elevated temperature and mixing the emulsion at the elevated temperature so as to invert the emulsion from a hydrocarbon in water emulsion to a water in hydrocarbon emulsion. In accordance with the present invention, it is critical that the resulting water in hydrocarbon emulsion product have a mean water droplet diameter of less than or equal to 4 microns ($\mu$m) and a maximum drop diameter of less than or equal to 10 microns ($\mu$m). In order to obtain a combustible fuel product which may be utilized in diesel engines the drop diameter of the resulting water in hydrocarbon emulsion must be controlled. The diameter of the water droplets is controlled by the following factors:

(1) the temperature at which the hydrocarbon in water emulsion is heated for inversion, (2) the concentration of the surfactant;

(3) the EO content of the surfactant;

(4) the mixing energy employed during the inversion process; and (5) the ratio of hydrocarbon to water in the original hydrocarbon in water emulsion.

Specifically, the temperature and mixing energy at which the inversion takes places increases with an increase in concentration and EO content of the surfactant and with a decrease in the hydrocarbon content.

Control of the water droplet size and the resulting water in hydrocarbon emulsion is critical in that (1) the presence of water allows for a more complete combustion in a diesel engine, (2) small water droplet sizes assist in atomization, and (3) the fuel can be combusted at lower temperatures which correspondingly result in lower formations of NOX products as well as less formation of soot.

Further advantages and features of the present invention will appear hereinbelow from a consideration of the detailed description.

BRIEF DESCRIPTION OF THE DRAWING

FIG. 1 is a schematic diagram of the process in accordance with the present invention.

DETAILED DESCRIPTION

The present invention is drawn to a process for utilizing a viscous hydrocarbon as a combustible fuel for diesel engines as well as a combustible fuel product for diesel engines in the form of a water in hydrocarbon emulsion.

The viscous hydrocarbons employed in the process of the present invention include naturally occurring bitumens and residual oils characterized by an API gravity of less than or equal to 16° API and a viscosity of greater than or equal to 100 cPs at 122° F. These viscous hydrocarbons in accordance with the present invention are handled for transportation purposes by forming a hydrocarbon in water emulsion. In accordance with the process of the present invention formation of the hydrocarbon in water emulsion employs the use of a surfactant package as an emulsifier. The hydrocarbon in water emulsion is characterized by a hydrocarbon to water ratio of from about 60:40 to about 98:2, preferably 65:35 to about 95:5. The surfactant is required to have an ethylene oxide content (EO content) of greater than or equal to 10 and preferably between about 10 to 25 and ideally about 15. In accordance with the present invention, the surfactant package comprises an amine in combination with an ethoxylated alcohol. The surfactant additive of the present invention can be used to provide stable emulsions using amounts of the amine and alcohol portions sufficiently small that the surfactant additive is desirable from an economic standpoint as well.

In accordance with the invention, the amine is preferably selected from the group consisting of monoethanolamine, ethylenediamine, ethylamine, diethylamine, triethylamine, propylamine, sec-propylamine, dipropylamine, isopropylamine, butylamine, sec-butylamine, tetramethylammonium hydroxide, tetrapropylammonium hydroxide and mixtures thereof. Preferably, the amine is an ethanolamine, most preferably monoethanolamine.

The ethoxylated alcohol component of the surfactant additive of the present invention is preferably selected from the group consisting of polyethoxylated C12–C14, saturated polyethoxylated C16–C18, unsaturated polyethoxylated C16–C18 and mixtures thereof, most preferably polyethoxylated tridecanol (C13).

One particularly well suited ethoxylated alcohol for use in accordance with the present invention is a polyethoxylated tridecanol provided by Hoechst de Venezuela under the trademark Genapol X-159 which has physical properties as follows: hydrophilic and lipophilic balance of 15.4; average number of moles, ethylene oxide, of 15; cloud point of 83°; 90% active.

According to the invention, the emulsion is preferably provided having surfactant additive including amine in an amount of at least about 300 parts per million (ppm) (wt) and having ethoxylated alcohol in an amount of at least about 100 ppm (wt) with respect to the hydrocarbon phase. More preferably, amine has been found to be particularly effective at between about 300 ppm to about 1500 ppm, and most preferably at about 400 ppm. Ethoxylated alcohol is preferably present between about 100 ppm to about 3000 ppm, and more preferably between about 800 ppm to about 1500 ppm, also based upon the weight with respect to the hydrocarbon phase. The hydrocarbon in water emulsion may be formed by any process known in the art. Suitable processes are disclosed for example in U.S. Pat. Nos. 4,776,977 and 4,934,398 and others discussed above.

In order to obtain a viscous hydrocarbon combustible fuel the hydrocarbon in water emulsion described above must be inverted into a water in hydrocarbon emulsion. In accordance with the present invention a suitable combustible fuel product for diesel engines comprises a water in hydrocarbon emulsion wherein the droplet size of the water within the emulsion are within critical values. It has been found that in order to get a more complete combustion at lower temperatures with minimal formations of nitric oxides and soot, the water in hydrocarbon emulsion combustible fuel for diesel engines should have a mean droplet diameter of less than or equal 4 microns with a maximum water drop diameter of less than or equal to 10 microns. Such a combustible fuel emulsion product having a water to hydrocarbon ratio of 40:60 to about 2:98 preferably 35:75 to about 5:95 and a surfactant package content of greater than 400 ppm and an EO content of preferably between 10 to 25 may be effectively atomized at lower temperatures and obtain complete combustion. When the water droplet diameters exceed the critical values set forth above, atomization of the fuel becomes incomplete, combustion efficiency is greatly decreased, and elevated temperatures are required for combustion thus resulting in the formation of high amounts of soot and NOX pollutants.

The water in hydrocarbon emulsion fuel product for use as a combustible fuel in a diesel engine is obtained from the hydrocarbon in water emulsion formed for transportation of the viscous hydrocarbon by subjecting the hydrocarbon in water emulsion to a controlled inversion process. The Figure is a schematic diagram of a process in accordance with the present invention. Prior to inversion, the emulsion is heated 12 in a suitable apparatus known in the art and subjected to a solid separation step to remove solid particulate. The solid separation may take place by either filtration or under centrifugal separation. Separation takes place at a temperature of between 60° C. to 150° C. In accordance with the present invention, the hydrocarbon in water emulsion is inverted at elevated temperature, that is, preferably greater than or equal to 90° C., and critical mixing energies 16, that is, preferably greater than or equal to $6 \times 10^6$ J/m$^3$ so as to invert the emulsion into a water in hydrocarbon emulsion having the required water droplet diameters, both mean and maximum. The inversion of the emulsion is carried out at a pressure of at least 3–5 bar(g) and is controlled by controlling the temperature and mixing energy during the inversion process wherein the temperature is a function of the concentration and EO content of the surfactant and the mixing energy is a function of the hydrocarbon content of the hydrocarbon in water emulsion. The temperatures required are greater than or equal to 60° C. and mixing energies of greater than or equal to $6.00 \times 10^6$ J/m$^3$. The inversion process is a function of temperature, mixing energy as well the nature of the surfactant package (EO content), the amount of the surfactant in the emulsion, the nature of the viscous hydrocarbon and the hydrocarbon content. These factors are controlled to obtain the critical water droplet size described above. The surfactant of the present invention allows for greater flexibility in the process parameters while assuring the final droplet size.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for utilizing a viscous hydrocarbon as a combustible fuel for a diesel engine comprising:

(a) providing a hydrocarbon in water emulsion having a hydrocarbon to water ratio of from about 60:40 to about 98:2 and a surfactant package in an amount of ≧400 ppm, said hydrocarbon being characterized by an API gravity of ≦16° API and a viscosity of ≧100 cPs at 122° F. and said surfactant package comprises an amine selected from the group consisting of an ethanolamine, ethylenediamine, ethylamine, diethylamine, triethylamine, propylamine, sec-propylamine, dipropylamine, isopropylamine, butylamine, sec-butylamine, tetramethylammonium hydroxide, tetrapropylammonium hydroxide and mixtures thereof and an ethoxylated alcohol and having an ethylene oxide (EO) content of $\geq$ about 10;

(b) subjecting said hydrocarbon in water emulsion to temperature and mixing energy so as to invert said hydrocarbon in water emulsion into a water in hydrocarbon emulsion characterized by a mean water drop diameter of $\leq 4$ μm and a maximum drop diameter of $\leq 10$ μm, wherein the elevated temperature increases with an increase in the EO content of the surfactant and the mixing energy increases with a decrease in the hydrocarbon content;

(c) atomizing said water in hydrocarbon emulsion; and (d) burning the water in hydrocarbon emulsion in a diesel engine.

2. A process according to claim 1 wherein said elevated temperature is $\geq 90°$ C. and said mixing energy is $\geq 6.00 \times 10^6$ J/m$^3$.

3. A process according to claim 1 wherein said (EO) content is between about 10 to 25.

4. A process according to claim 1, wherein said amine is present in an amount of about 300 ppm (wt) with respect to said hydrocarbon phase.

5. A process according to claim 1, wherein said ethoxylated alcohol is present in an amount between about 100 ppm (wt) to about 3000 ppm (wt) with respect to said hydrocarbon phase.

6. A process according to claim 1, wherein said ethoxylated alcohol is present in an amount between about 800 ppm (wt) to about 1500 ppm (wt) with respect to said hydrocarbon phase.

7. A process according to claim 1, wherein said amine is an ethanolamine.

8. A process according to claim 7, wherein said amine is monoethanolamine.

9. A process according to claim 1, wherein said ethoxylated alcohol is selected from the group consisting of polyethoxylated C12–C14, saturated polyethoxylated C16–C18, unsaturated polyethoxylated C16–C18 and mixtures thereof.

10. A process according to claim 8, wherein said ethoxylated alcohol is polyethoxylated tridecanol (C13).

11. A process according to claim 1, wherein said hydrocarbon phase is bitumen.

12. A process according to claim 1, wherein said hydrocarbon phase is Cerro Negro bitumen.

13. A combustible fuel for diesel engines comprising a water in hydrocarbon emulsion having a water to hydrocarbon ratio of from about 40:60 to 2:98 and a surfactant package in an amount of $\geq 800$ ppm, said hydrocarbon being characterized by an API gravity of $\leq 16°$ API and a viscosity of $\geq 100$ cPs at 122° F. and said surfactant package having an ethylene oxide (EO) content of $\geq 10$, said water in hydrocarbon emulsion being characterized by a mean water drop diameter of $\leq 4$ μm with a maximum drop diameter of $\leq 10$ μm.

* * * * *